US009550488B1

(12) United States Patent
Johri et al.

(10) Patent No.: US 9,550,488 B1
(45) Date of Patent: Jan. 24, 2017

(54) HYBRID VEHICLE AND METHOD OF CONTROLLING A HYBRID VEHICLE POWERTRAIN

(71) Applicant: FORD GLOBAL TECHNOLOGIES, LLC, Dearborn, MI (US)

(72) Inventors: Rajit Johri, Canton, MI (US); Francis Thomas Connolly, Ann Arbor, MI (US); Jason Meyer, Canton, MI (US); Jeffrey Allen Doering, Canton, MI (US); Xiaoyong Wang, Novi, MI (US); Mark Steven Yamazaki, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/856,019

(22) Filed: Sep. 16, 2015

(51) Int. Cl.

| | |
|---|---|
| ***B60W 10/02*** | (2006.01) |
| ***B60W 10/08*** | (2006.01) |
| ***B60W 20/00*** | (2016.01) |
| ***B60K 6/38*** | (2007.10) |

(52) U.S. Cl.
CPC .............. *B60W 10/023* (2013.01); *B60K 6/38* (2013.01); *B60W 10/08* (2013.01); *B60W 20/00* (2013.01); *B60Y 2300/42* (2013.01); *B60Y 2300/60* (2013.01); *B60Y 2400/426* (2013.01); *Y10S 903/912* (2013.01); *Y10S 903/946* (2013.01)

(58) Field of Classification Search
CPC .... B60W 10/023; B60W 20/00; B60W 10/08; B60K 6/38; B60Y 2300/60; B60Y 2300/42; B60Y 2400/426; Y10S 903/946; Y10S 903/912
USPC .......................................................... 701/22
See application file for complete search history.

(56) References Cited

U.S. PATENT DOCUMENTS

| | | | |
|---|---|---|---|
| 2013/0296104 | A1 | 11/2013 | Nefcy |
| 2014/0162838 | A1 | 6/2014 | Doering et al. |
| 2015/0066264 | A1 | 3/2015 | Wang et al. |

*Primary Examiner* — Brian P Sweeney
(74) *Attorney, Agent, or Firm* — David Kelley; Brooks Kushman P.C.

(57) ABSTRACT

A vehicle includes an engine, an electric machine, a torque converter and a controller. The torque converter includes an impeller and receives power from the engine and electric machine. The controller, in response to an absence of driver demanded torque and a difference between desired and estimated impeller speeds, adjusts a torque of the electric machine based on a difference between an estimated engine torque and a desired impeller torque in order to drive the impeller toward the desired impeller speed.

17 Claims, 3 Drawing Sheets

HYBRID VEHICLE AND METHOD OF CONTROLLING A HYBRID VEHICLE POWERTRAIN

TECHNICAL FIELD

The present disclosure relates to hybrid vehicles and control of hybrid vehicle powertrains.

BACKGROUND

Hybrid vehicle powertrains may control the power output of an internal combustion engine and electric motor to obtain a desired power output of the hybrid vehicle powertrain.

SUMMARY

A vehicle includes an engine, an electric machine, a torque converter and a controller. The torque converter includes an impeller and is configured to receive power from the engine and electric machine. The controller is programmed to, in response to an absence of driver demanded torque and a difference between desired and estimated impeller speeds, adjust a torque of the electric machine based on a difference between an estimated engine torque and a desired impeller torque in order to drive the impeller toward the desired impeller speed.

A vehicle includes an engine, a torque converter, a motor, and a controller. The engine is configured to deliver a steady state power load to an impeller of the torque converter during an absence of driver demanded torque. The motor is also configured to deliver power to the impeller. The controller is programmed to, in response to a difference between desired and estimated impeller speeds, adjust a torque of the motor based on a deviation of the load in order to drive the impeller toward the desired impeller speed.

A method of controlling a vehicle that includes an engine and a motor configured to deliver power to an impeller of a torque converter is provided. The method includes adjusting a torque of the motor, in response to an absence of driver demanded torque and a difference between desired and estimated impeller speeds, based on a difference between an estimated engine torque and a desired impeller torque and also based on the difference between the desired and estimated impeller speeds.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
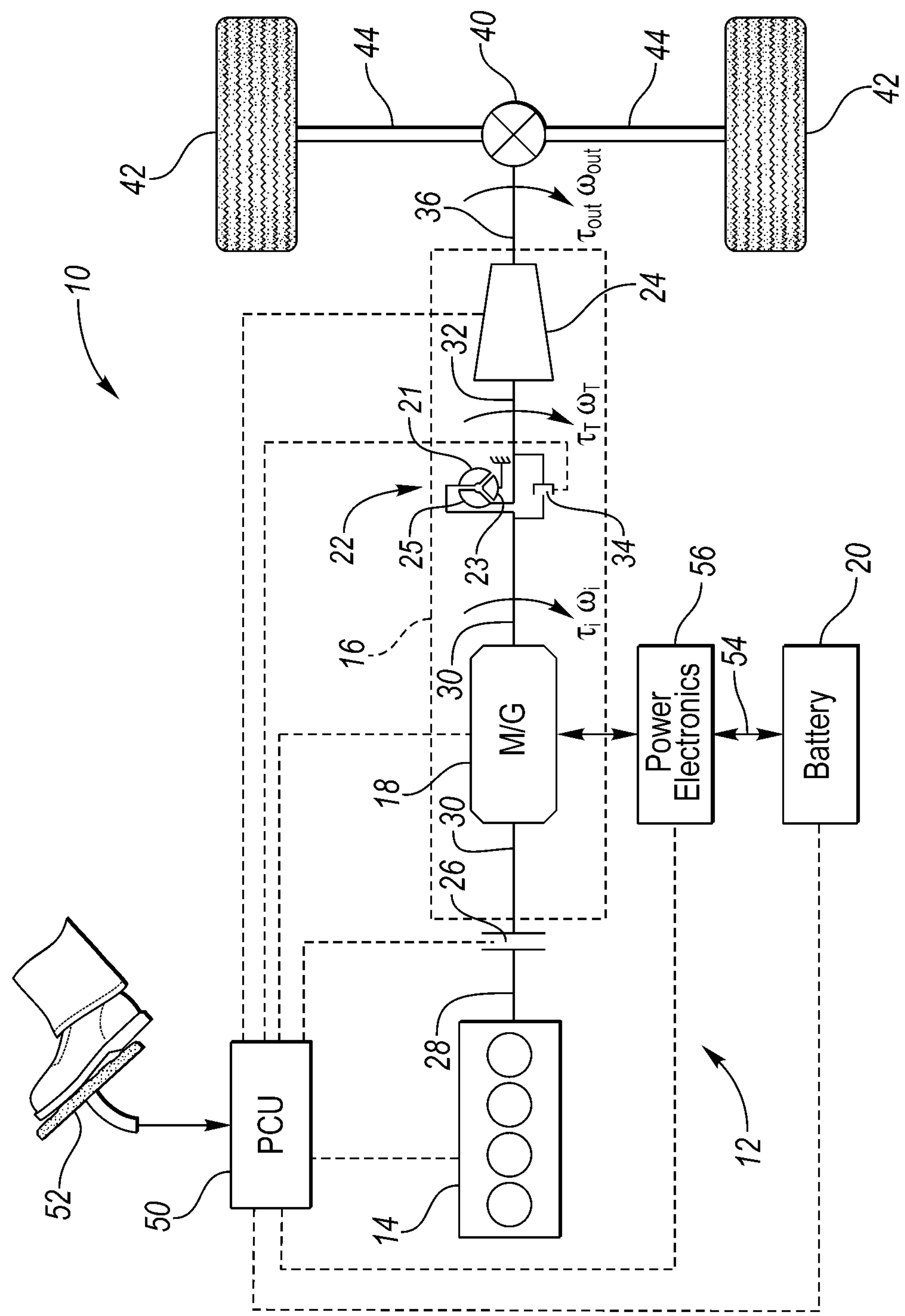
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 21 (which may be fixed to M/G shaft 30), a stator 23, and a turbine 25 (which may be fixed to a transmission input shaft 32). The torque converter 22 thus provides a hydraulic coupling between shaft 30 and transmission input shaft 32. The torque converter 22 is configured to transmit the power from the engine 14 and M/G 18 to the transmission 24 (or gearbox). Internally, the torque converter 22 transmits power from the impeller 21 to the turbine 25 when the impeller 21 rotates faster than the turbine 25. The power on the impeller 21 is represented by $\tau_i\omega_i$, where $\tau_i$ is the impeller torque and $\omega_i$ is the speed of the impeller 21. The power on the turbine 25 is represented by $\tau_t\omega_t$, where $\tau_t$ is the turbine torque and $\omega_t$ is the speed of the turbine 25. The magnitudes of the turbine torque $\tau_t$ and impeller torque $\tau_i$ generally depend upon the relative speeds. When the ratio of impeller speed $\omega_i$ to turbine speed $\omega_t$ is sufficiently high, the turbine torque $\tau_t$ is a multiple of the impeller torque $\tau_i$. A torque converter bypass clutch (also known as a torque converter lock-up clutch) 34 may also be provided that, when engaged, frictionally or mechanically couples the impeller 21 and the turbine 25 of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and torque converter bypass clutch 34 is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output power and torque to output shaft 36. The powertrain output power and torque may also be referred to as the transmission output power and torque. The powertrain output power is represented by $\tau_{out}\omega_{out}$, where $\tau_{out}$ is the output torque of the powertrain and $\omega_{out}$ is the output speed of the powertrain.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission impeller speed (TI), transmission turbine speed (TS), torque converter bypass clutch 34 status (TCC), deceleration or shift mode (MDE), battery temperature, voltage, current, or state of charge (SOC) for example.

Control logic, functions, or algorithms performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller 21 and the turbine 25. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
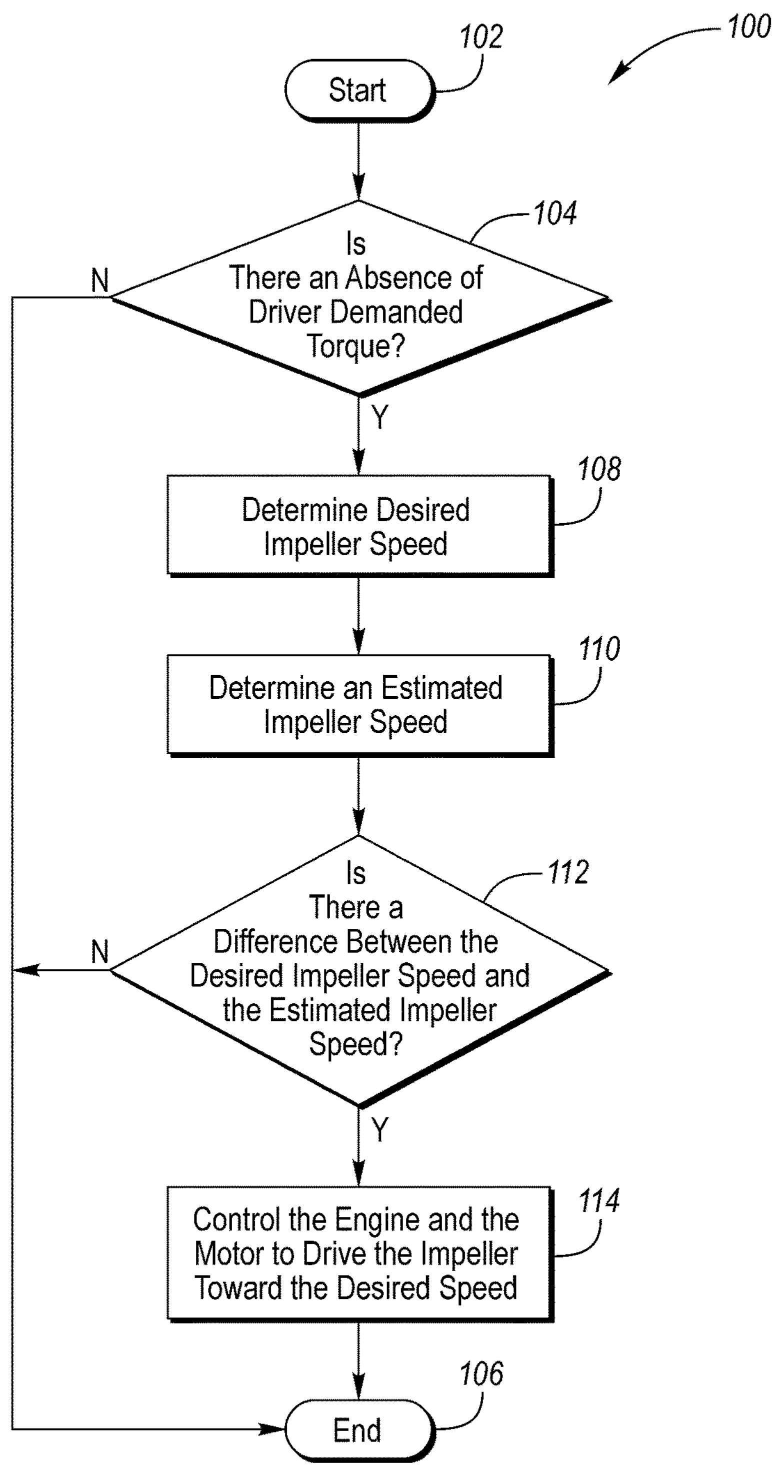
FIG. 2 is a flowchart illustrating a method of controlling an engine and an electric machine.

Referring to FIG. 2, flowchart illustrating a method 100 of controlling the engine 14 and the M/G 18 is illustrated. The method 100 should not be construed as limited to the configuration as illustrated in FIG. 2, but should include variations where some of the steps may be re-arranged and variations were some of the steps may be removed entirely. The method 100 may be implemented using software code contained within the controller 50. The software code may include any of the necessary algorithms required to perform the method 100. In other embodiments, the method 100 may be implemented in other controllers, or distributed among multiple controllers.

The method 100 is initiated at start block 102. The method 100 may be initiated by placing a vehicle ignition into an "on" position or by pressing a "start/run" button. Once the method 100 has been initiated at start block 102, the method moves on to step 104.

At step 104 it is determined if there is an absence of driver demanded torque. An absence of driver demanded torque is indicative that a driver of the HEV 10 has not depressed the accelerator pedal or has completely released the accelerator pedal 52. If there is not an absence of driver demanded torque, the method ends at step 106. When there is not an absence of driver demanded torque, the driver of the HEV 10 is depressing the accelerator pedal 52 in order to request torque from either one or both of the engine 14 and the M/G 18. If there is an absence of driver demanded torque, the method moves on to step 108.

At step 108 a desired speed $\omega_{imp\_des}$ of the impeller 21 is determined. The desired impeller speed $\omega_{imp\_des}$ may be based minimum transmission speed requirements (e.g., the minimum speed required to operation a transmission oil pump), minimum engine speed requirements (e.g., the minimum speed required to ensure the catalytic converter in operating at a desired temperature), or minimum speed requirements to account for accessory loads (e.g., air conditioning load, alternator load, water pump load, power steering load, etc.). Once the desired impeller speed $\omega_{imp\_des}$ has been determined at step 108, the method moves on to step 110.

At step 110 an estimated speed $\omega_{imp\_est}$ of the impeller 21 of the torque converter 22 is determined. The estimated impeller speed $\omega_{imp\_est}$ may be an actual or estimated speed that is determined by a speed sensor. For example, the speed sensor may be configured to detect the speed of the M/G 18 or the shaft 30 in order to determine the estimated impeller speed $\omega_{imp\_est}$. The speed sensor may then transmit the estimated impeller speed $\omega_{imp\_est}$ back to the controller 50. Once the estimated impeller speed $\omega_{imp\_est}$ has been determined at step 110, the method moves on to step 112.

At step 112 it is determined if there is a difference between the desired impeller speed $\omega_{imp\_des}$ and the estimated impeller speed $\omega_{imp\_est}$. The difference between the desired impeller speed $\omega_{imp\_des}$ and the estimated impeller speed $\omega_{imp\_est}$ may be based on a disturbance in the torque or power load of the engine 14 during a steady state condition such as idling, vehicle coasting, park-neutral charging of the battery 20, vehicle creep, hill holding, etc. During a steady state operation of the engine 14, the engine 14 may be configured to deliver a steady state power load to the impeller 21. The power load of the engine 14 may be represented by the torque of the engine multiplied by the angular speed of the crankshaft 28. Alternatively, the difference between the desired impeller speed $\omega_{imp\_des}$ and the estimated impeller speed $\omega_{imp\_est}$ may be based on a transient condition of the vehicle coinciding with an absence of a driver demanded torque such as a tip-out of the accelerator pedal 52, a change of gradient while the vehicle is creeping, a change in desired impeller speed (e.g., a change in desired impeller speed may result from a change in desired engine speed that occurs when the engine reaches a desired operating temperature from a startup temperature that is below desired operating temperature), etc. If there is no difference between the desired impeller speed $\omega_{imp\_des}$ and the estimated impeller speed $\omega_{imp\_est}$ the method 100 ends at step 106. If there is difference between the desired impeller speed $\omega_{imp\_des}$ and the estimated impeller speed $\omega_{imp\_est}$ the method moves on to step 114.

Figure 3:
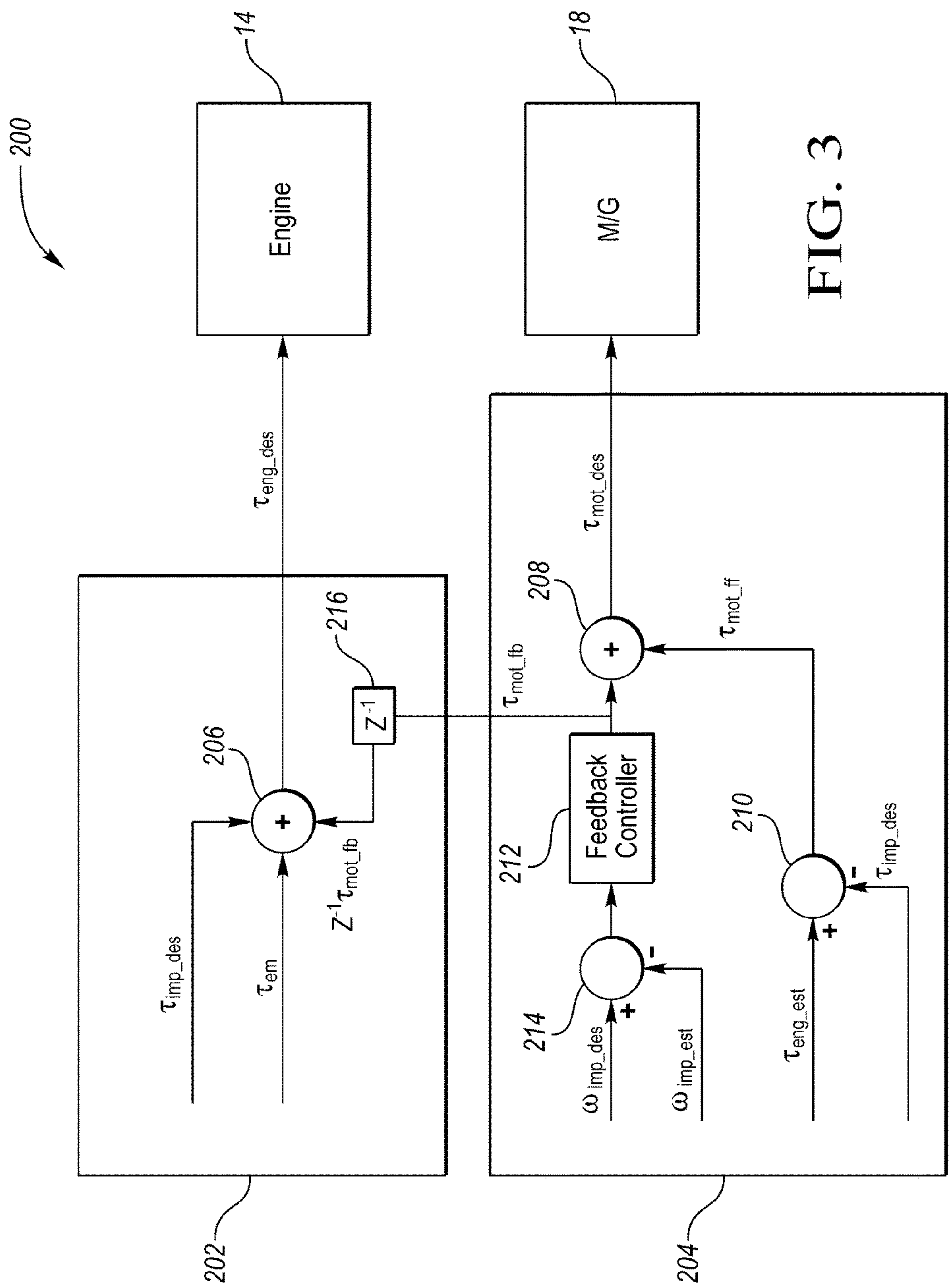
FIG. 3 illustrates an algorithm for controlling torque output of engine and the electric machine.

At step 114 the engine 14 and the M/G 18 are controlled to drive the impeller 21 toward the desired impeller speed $\omega_{imp\_des}$. The engine 14 and M/G 18 may be controlled based on a control algorithm 200 that is depicted in FIG. 3. Once it is no longer necessary to control the engine 14 and M/G 18, the method 100 will end at step 106.

Referring to FIG. 3, the algorithm 200 for controlling and adjusting the torque output of the engine 14 and the M/G 18 is illustrated. The algorithm 200 may be implemented using software code contained within the controller 50. In other embodiments, the algorithm 200 may be implemented in other controllers, or distributed among multiple controllers. The algorithm 200 includes an engine control module 202 and an M/G control module 204.

The engine control module 202 includes generating the desired engine torque $\tau_{eng\_des}$. A desired impeller torque $\tau_{imp\_des}$ and an energy management torque $\tau_{em}$ are input into summation node 206. The output of summation node 206 is the desired engine torque $\tau_{eng\_des}$. The desired engine torque $\tau_{eng\_des}$ is then sent as the commanded torque to the engine 14. The desired engine torque $\tau_{eng\_des}$, may be represented by the following:

$$\tau_{eng\_des}=\tau_{imp\_des}+\tau_{em} \quad (1)$$

where $\tau_{imp\_des}$ is the desired impeller torque during an absence of driver demanded torque and $T_{em}$ is the energy management torque of the M/G 18 required for charging the battery 20. The desired engine torque $\tau_{eng\_des}$ may correspond to the torque needed to operate the engine 14 during engine idling, vehicle coasting, park-neutral charging of the battery 20, vehicle creep, hill holding, or any other steady operation of the engine 14.

The desired impeller torque $\tau_{imp\_des}$ may be based on the desired impeller speed and capacity factor and torque ratio curves for a given torque converter. The desired impeller torque $\tau_{imp\_des}$ may be represented by the following:

$$\tau_{imp\_des}=\left(\frac{\omega_{imp\_des}}{K(SR)}\right)^2 \quad (2)$$

where $\omega_{imp\_des}$ is the desired impeller speed and K is the capacity factor curve of the torque converter 22, which is a function of the speed ratio SR.

The speed ratio SR may be represented by the following:

$$SR=\frac{\omega_{imp\_des}}{\omega_{tur\_est}} \quad (3)$$

where $\omega_{imp\_des}$ is the desired impeller speed and $\omega_{tur\_est}$ is a current speed of the turbine 25 of the torque converter 22. The current turbine speed $\omega_{tur\_est}$ may be an actual or estimated speed that is determined by a speed sensor. For example, a speed sensor may be configured to detect the speed of the transmission input shaft 32 in order to determine the current turbine speed $\omega_{tur\_est}$. The speed sensor may then transmit the current turbine speed $\omega_{tur\_est}$ back to the controller 50.

The M/G control module 204 includes generating a desired torque $\tau_{mot\_des}$ of the M/G 18. The desired M/G torque $\tau_{mot\_des}$ includes a feedforward torque command $\tau_{mot\_ff}$ and a feedback torque command $\tau_{mot\_fb}$. The feedforward torque command $\tau_{mot\_ff}$ and feedback torque command $\tau_{mot\_fb}$ are input into summation node 208. The output of summation node 208 is the desired M/G torque $\tau_{mot\_des}$. The desired M/G torque $\tau_{mot\_des}$ is then sent as the commanded torque to the M/G 18. The desired M/G torque $\tau_{mot\_des}$ may be represented by the following:

$$\tau_{mot\_des}=\tau_{mot\_ff}+\tau_{mot\_fb} \quad (4)$$

where $\tau_{mot\_ff}$ is the feedforward torque command of the M/G 18 and $\tau_{mot\_fb}$ is the feedback torque command of the M/G 18.

The feedforward torque command $\tau_{mot\_ff}$ of the M/G 18 may be represented as the difference between an estimated torque of the engine $\tau_{eng\_est}$ and the desired impeller torque $\tau_{imp\_des}$. The estimated engine torque $\tau_{eng\_est}$ and the desired impeller torque $\tau_{imp\_des}$ are input into subtraction node 210. The output of subtraction node 210 is the feedforward torque command $\tau_{mot\_ff}$ of the M/G 18. The feedforward torque command $\tau_{mot\_ff}$ of the M/G 18 may be represented by the following:

$$\tau_{mot\_ff}=\tau_{eng\_est}-\tau_{imp\_des} \quad (5)$$

where $\tau_{eng\_est}$ is the estimated engine torque and $\tau_{imp\_des}$ is the desired impeller torque. The estimated engine torque $\tau_{eng\_est}$ may be an actual or estimated torque that is determined by a torque sensor. For example, the torque sensor may be configured to detect the torque on the crankshaft 28 in order to determine the estimated engine torque $\tau_{eng\_est}$. The torque sensor may then transmit the estimated engine torque $\tau_{eng\_est}$ back to the controller 50.

The feedback torque command $\tau_{mot\_fb}$ of the M/G 18 is generated by inputting the difference between the desired impeller speed $\omega_{imp\_des}$ and the estimated impeller speed $\omega_{imp\_est}$ into a feedback controller 212. The desired impeller speed $\omega_{imp\_des}$ and the estimated impeller speed $\omega_{imp\_est}$ are input into subtraction node 214. The output of the subtraction node 214 being the difference between the desired impeller speed $\omega_{imp\_des}$ and the estimated impeller speed $\omega_{imp\_est}$ which is then input into the feedback controller 212. The feedback controller 212 may include a proportional term, an integral term, and/or a derivative term. For example, the feedback controller 212 may be a P controller, PD controller, PID controller, or any other variation thereof. The output of the feedback controller 212 is the feedback torque command $\tau_{mot\_fb}$ of the M/G 18.

The desired engine torque $\tau_{eng\_des}$ may be further adjusted by an error term that is based on the feedback torque command $\tau_{mot\_fb}$ of the M/G 18. This may be required when there is an error in the estimated engine torque $\tau_{eng\_est}$ and/or an error in an estimated impeller torque $\tau_{imp\_est}$. The estimated impeller torque $\tau_{imp\_est}$ may be an actual or estimated torque that is determined by a torque sensor. For example, the torque sensor may be configured to detect the torque of the M/G 18 or the shaft 30 in order to determine the estimated impeller torque $\tau_{imp\_est}$. Alternatively, the estimated impeller torque may be obtained by inputting the estimated impeller speed $\omega_{imp\_est}$ into equations (2) and (3) as opposed to inputting the desired impeller speed $\omega_{imp\_des}$ into equations (2) and (3).

The error term may be generated by inputting the feedback torque command $\tau_{mot\_fb}$ of the M/G 18 into an error controller 216. The error controller 216 may also be referred to as a calculation delay module. The error controller 216 may include an integral portion of the feedback controller 212. The integral portion may be the last value of the integral portion of the feedback controller 212 or an accumulation of multiple past values of the integral portion of the feedback controller 212. The error controller 216 allows the engine control module 202 to adjust the desired engine torque $\tau_{eng\_des}$ by adaptively learning the existing errors in the estimated engine torque $\tau_{eng\_est}$ and/or the estimated impeller torque $\tau_{imp\_est}$. The output of the error controller 216 may be an error term represented by $Z^{-1}\tau_{mot\_fb}$. Equation (1) above may be altered to include the output of the error controller 216 and rewritten as follows:

$$\tau_{eng\_des}=\tau_{imp\_des}+\tau_{em}+Z^{-1}\tau_{mot\_fb} \quad (6)$$

where $T_{eng\_des}$ is the desired engine torque, $T_{imp\_des}$ is the desired impeller torque, $\tau_{em}$ is the energy management torque, and $Z^{-1}\tau_{mot\_fb}$ is the error term.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:

an engine;

an electric machine;

a torque converter including an impeller and configured to receive power from the engine and electric machine; and a controller programmed to, in response to an absence of driver demanded torque and a difference between desired and estimated impeller speeds, adjust electric machine torque based on a difference between estimated engine torque and desired impeller torque to drive the impeller toward the desired impeller speed.

2. The vehicle of claim 1, wherein the desired impeller torque is based on a difference between desired engine torque and battery charging torque.

3. The vehicle of claim 2, wherein the torque converter further includes a turbine and wherein the desired impeller torque is further based on current turbine speed and the desired impeller speed.

4. The vehicle of claim 3, wherein the controller is further programmed to adjust the electric machine torque based on a feedback term that is defined by a difference between the desired and estimated impeller speeds.

5. The vehicle of claim 4, wherein the controller is further programmed to adjust the desired engine torque based on an error term that is defined by the feedback term.

6. The vehicle of claim 4, wherein the difference between the desired and estimated impeller speeds results from a disturbance in the desired engine torque during steady state operation of the engine.

7. A vehicle comprising:

an engine configured to deliver a steady state power load to an impeller of a torque converter during an absence of driver demanded torque;

a motor configured to deliver power to the impeller; and a controller programmed to, in response to a difference between desired and estimated impeller speeds, adjust motor torque based on a deviation of the load to drive the impeller toward the desired impeller speed.

8. The vehicle of claim 7, wherein the deviation is defined by a difference between estimated engine torque and desired impeller torque.

9. The vehicle of claim 8, wherein the desired impeller torque is based on a difference between battery charging torque and desired engine torque.

10. The vehicle of claim 9, wherein the torque converter includes a turbine and wherein the desired impeller torque is further based on current turbine speed and the desired impeller speed.

11. The vehicle of claim 10, wherein the controller is further programmed to adjust the motor torque based on a feedback term defined by a difference between the desired and estimated impeller speeds.

12. The vehicle of claim 11, wherein the controller is further programmed to adjust the desired engine torque by an error term that is defined by the feedback term.

13. The vehicle of claim 11, wherein the difference between the desired and estimated impeller speeds results from a disturbance in the desired engine torque during steady state operation of the engine.

14. A method of controlling an engine and motor each configured to deliver power to a torque converter impeller comprising:

in response to an absence of driver demanded torque and a difference between desired and estimated impeller speeds, adjusting motor torque based on a difference between estimated engine and desired impeller torques and the difference between desired and estimated impeller speeds to drive the impeller toward the desired impeller speed.

15. The method of claim 14, wherein the desired impeller torque is based on a difference between desired engine torque and battery charging torque.

16. The method of claim 15, wherein the desired impeller torque is further based on current torque converter turbine speed and the desired impeller speed.

17. The method of claim 16, wherein the difference between the desired and estimated impeller speeds results from a disturbance in the desired engine torque during steady state operation of the engine.

* * * * *